United States Patent
Choo et al.

(10) Patent No.: US 7,338,854 B2
(45) Date of Patent: Mar. 4, 2008

(54) METHOD FOR MANUFACTURING MULTILAYER CERAMIC CAPACITOR

(75) Inventors: Ho Sung Choo, Daegu (KR); Seung Hyun Ra, Kyungki-do (KR); Yong Suk Kim, Kyungki-do (KR); Jung Woo Lee, Kyungki-do (KR); Hyo Soon Shin, Kyungki-do (KR); Hyoung Ho Kim, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 267 days.

(21) Appl. No.: 11/002,183

(22) Filed: Dec. 3, 2004

(65) Prior Publication Data

US 2005/0132548 A1   Jun. 23, 2005

(30) Foreign Application Priority Data

Dec. 5, 2003   (KR) ............. 10-2003-0088125

(51) Int. Cl.
*H01L 21/8242* (2006.01)
(52) U.S. Cl. .......... 438/253; 438/210; 438/239; 438/240; 438/396; 29/25.03
(58) Field of Classification Search ........ 438/210, 438/239, 240, 393, 396, FOR. 220, FOR. 430, 438/253; 29/25.03
See application file for complete search history.

(56) References Cited

U.S. PATENT DOCUMENTS

2003/0041427 A1* 3/2003 Hattori ............. 29/25.42
2003/0170432 A1* 9/2003 Kobayashi et al. ......... 428/209
2004/0070903 A1* 4/2004 Nagai et al. ............ 361/58

FOREIGN PATENT DOCUMENTS

| JP | 61-24215 A | 2/1986 |
| JP | 63-284893 A | 11/1988 |
| JP | 02-036513 A | 2/1990 |
| JP | 6-38225 U | 5/1994 |
| JP | 08-141480 A | 6/1996 |

(Continued)

OTHER PUBLICATIONS

Japanese Patent Office Action mailed Nov. 27, 2007 English Translation.

*Primary Examiner*—George Fourson
*Assistant Examiner*—Joannie Adelle García
(74) *Attorney, Agent, or Firm*—Lowe Hauptman Ham & Berner (57) ABSTRACT

A method for manufacturing a multilayer ceramic capacitor, in which internal electrodes printed on each of a plurality of dielectric sheets have reduced thicknesses using an absorption member, thereby allowing the multilayer ceramic capacitor to have a high capacity and be minimized. The method includes printing the internal electrodes on each of the dielectric sheets, and stacking the dielectric sheets, wherein the internal electrodes formed on each of the dielectric sheets have a reduced thickness by causing an absorptive member to contact the surface of each of the dielectric sheets provided with the internal electrodes and then separating the absorptive member from the surface so that portions of the internal electrodes having a designated thickness are eliminated, and the dielectric sheets provided with the internal electrodes having the reduced thickness are stacked to form a chip element.

40 Claims, 3 Drawing Sheets

FOREIGN PATENT DOCUMENTS

| | | |
|---|---|---|
| JP | 10-308322 A | 11/1998 |
| JP | 03-248410 B2 | 1/1999 |
| JP | 11-291439 A | 10/1999 |
| JP | 2003-309037 A | 10/2003 |
| JP | 2003-318060 A | 11/2003 |

* cited by examiner

METHOD FOR MANUFACTURING MULTILAYER CERAMIC CAPACITOR

RELATED APPLICATIONS

The present application is based on, and claims priority from, Korean Application Number 2003-88125, filed Dec. 5, 2003, the disclosure of which is hereby incorporated by reference herein in the entirety.

BACKGROUND OF THE INVENTION

1. Field of the Invention

The present invention relates to a method for manufacturing a multilayer ceramic capacitor, in which internal electrodes printed on each of a plurality of dielectric sheets have reduced thicknesses using an absorption member, thereby allowing the multilayer ceramic capacitor to have a high capacity and be minimized.

2. Description of the Related Art

A multilayer ceramic capacitor (hereinafter, referred to as a "MLCC") is an electronic element serving to intercept a DC signal, bypass, and resonate frequency. In order to satisfy miniaturization and light-weight trends of electronic products, MLCCs have been increasingly used. Further, demand for MLCCs has increased according to digitization of electronic products and expansion of the mobile communication market.

Particularly, MLCCs having high stability and super-high capacity have been developed, and many methods for manufacturing the above MLCCs have been proposed. First, a method for increasing the number of dielectric layers having uniform thin thicknesses to be stacked in the same volume has been proposed. Further, a method for increasing the dielectric constant of dielectric powder has been proposed. Together with the above methods, methods for equalizing and reducing the thickness an electrode layer printed on each of the dielectric sheets have been developed.

In order to satisfy the high-capacity and miniaturization trends of a $BaTiO_3$-group high-capacity MLCC, a technique for manufacturing a thin dielectric sheet having a reduced thickness less than approximately 1 μm has been developed. In case that an electrode layer is printed on the thin dielectric sheet by screen printing, the thickness of the electrode layer may be larger than that of the thin dielectric layer.

Figure 1:
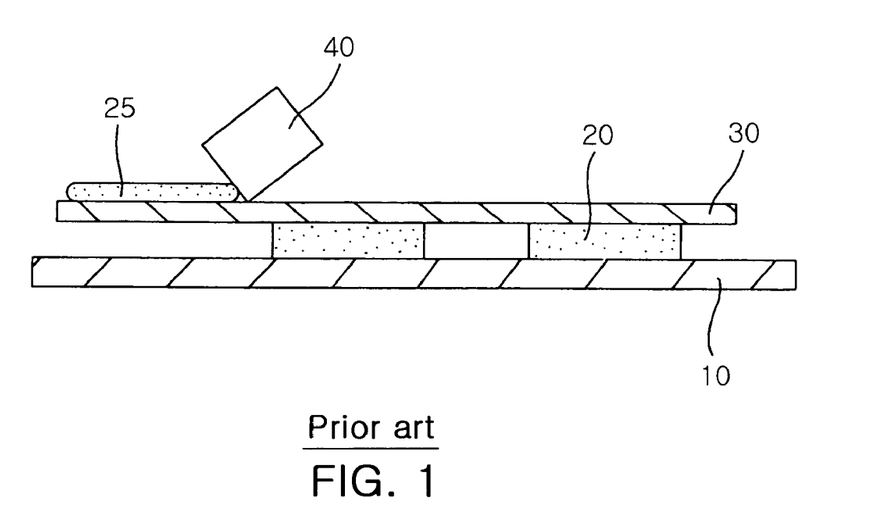
FIG. 1 is a sectional view illustrating a conventional process for forming electrodes on a dielectric sheet using screen printing.

FIG. 1 is a sectional view illustrating a conventional process for forming electrodes on a dielectric sheet using screen printing. As shown in FIG. 1, a screen 30 provided with meshes in a designated number is prepared to print internal electrodes 20 on a dielectric sheet 10. A Cu or Ni paste 25 for forming the internal electrodes 20 is placed on the upper surface of the screen 30, and is squeezed using a squeezer 40. Through the above procedure, the internal electrodes 20 are printed on the dielectric sheet 10.

In the above-described screen printing, the thickness of the internal electrodes 20 formed on the dielectric sheet 10 is determined by adjusting the viscosity of the paste 25 or the number of the meshes of the screen 30. Since the adjustment of the viscosity of the paste and the number of the screen meshes are limited, it is difficult to thin the internal electrodes 20 in the same manner as the dielectric sheet 30.

In order to meet with the small-thickness trend of the dielectric sheet, the thickness of the internal electrodes must be reduced. Since the thickness of the internal electrodes is larger than the thickness of each of the dielectric sheets in the conventional multilayer ceramic capacitor, it is difficult to increase the number of the dielectric sheets to be stacked.

Further, in case that an ultra-thin dielectric sheet is formed and internal electrodes are printed on the dielectric sheet, the thickness of the internal electrodes becomes larger than thickness of the dielectric sheet. Here, when a plurality of the dielectric sheets are stacked under pressure, the dielectric sheets are torn or the internal electrodes are short-circuited due to a difference of heights between the electrode and the dielectric sheet.

SUMMARY OF THE INVENTION

Therefore, the present invention has been made in view of the above problems, and it is an object of the present invention to provide a method for manufacturing a multilayer ceramic capacitor, in which ultra-thin internal electrodes are printed on each of a plurality of dielectric sheets.

It is another object of the present invention to provide a method for manufacturing a multilayer ceramic capacitor, which increases the number of dielectric sheets to be stacked in the same volume and has a high capacity.

In accordance with one aspect of the present invention, the above and other objects can be accomplished by the provision of a method for manufacturing a multilayer ceramic capacitor comprising printing internal electrodes on each of a plurality of dielectric sheets, and stacking the dielectric sheets, wherein the internal electrodes formed on each of the dielectric sheets have a reduced thickness by causing an absorptive member to contact the surface of each of the dielectric sheets provided with the internal electrodes and then separating the absorptive member from the surface so that portions of the internal electrodes having a designated thickness are eliminated, and the dielectric sheets provided with the internal electrodes having the reduced thickness are stacked to form a chip element.

Preferably, the reduced thickness of the internal electrodes may be smaller than the thickness of each of the dielectric sheets, and internal electrodes may be made of Cu or Ni.

Further, preferably, the internal electrodes may be formed on each of the dielectric sheets by screen printing.

Preferably, the absorptive member may be paper, a dielectric sheet, a thin film, the surface of which is printed with a polymeric substance capable of absorbing the internal electrodes, or a thin film containing a polymeric substance capable of absorbing the internal electrodes. The polymeric substance may be one selected from the group consisting of cellulose, polyethylene, and polyvinyl butylene.

Further, preferably, the absorptive member may be a roller applying a designated pressure to the internal electrodes and contacting the internal electrodes, the surface of the roller may be coated with a polymeric substance capable of absorbing the internal electrodes, and the polymeric substance may be one selected from the group consisting of cellulose, polyethylene, and polyvinyl butylene. More preferably, the roller may pair with a corresponding roller contacting the lower surface of the dielectric sheet.

Preferably, the formation of the reduced thicknesses of the internal electrodes, by absorbing the internal electrodes onto the absorptive member and then separating the absorptive member from the internal electrodes, may be performed prior to completely drying the internal electrodes by supplying a heat source to the internal electrodes printed on each of the dielectric sheets.

More preferably, the absorption of the internal electrodes onto the absorptive member may be performed just after the formation of the internal electrodes on each of the dielectric sheets by screen printing is terminated, and the separation of the absorptive member from the internal electrodes may be performed at a velocity of 40 to 60 cm/sec.

Further, preferably, portions of the internal electrodes absorbed onto the roller may be scrapped by a scrapper, and eliminated by suction force supplied from a front end of the scrapper.

In accordance with another aspect of the present invention, there is provided a method for manufacturing a multilayer ceramic capacitor comprising: preparing a plurality of dielectric sheets; printing internal electrodes having a designated thickness on each of the dielectric sheets using a screen having meshes in a designated number; reducing the thickness of the internal electrodes by causing an absorptive member to contact the surface of each of the dielectric sheets provided with the internal electrodes and then separating the absorptive member from the surface so that portions of the internal electrodes having a designated thickness are eliminated; stacking a plurality of the dielectric sheets, having the internal electrodes printed thereon, under pressure; cutting the stacked dielectric sheets into unit chips; and plastic-forming and baking the chips.

Preferably, the reduced thickness of the internal electrodes may be smaller than the thickness of each of the dielectric sheets, and the internal electrodes may be made of Cu or Ni.

Further, preferably, the internal electrodes may be formed on each of the dielectric sheets by screen printing.

Preferably, the absorptive member may be paper, a dielectric sheet, a thin film, the surface of which is printed with a polymeric substance capable of absorbing the internal electrodes, or a thin film containing a polymeric substance capable of absorbing the internal electrodes. More preferably, the polymeric substance may be one selected from the group consisting of cellulose, polyethylene, and polyvinyl butylene.

Further, preferably, the absorptive member may be a roller applying a designated pressure to the internal electrodes and contacting the internal electrodes, the surface of the roller may be coated with a polymeric substance capable of absorbing the internal electrodes, and the polymeric substance may be one selected from the group consisting of cellulose, polyethylene, and polyvinyl butylene. More preferably, the roller may pair with a corresponding roller contacting the lower surface of the dielectric sheet.

Preferably, the reduction of the thickness of the internal electrodes may include absorbing the internal electrodes onto the absorptive member by causing the absorptive member to contact the internal electrodes of each of the dielectric sheets; and eliminating portions of the internal electrodes and causing the remainder of the internal electrodes to remain on each of the dielectric sheets by separating the absorptive member from the internal electrodes. More preferably, the reduction of the thickness of the internal electrodes may be performed prior to drying the internal electrodes by supplying a heat source to the internal electrodes printed on each of the dielectric sheets, and the absorption of the internal electrodes onto the absorptive member may be performed just after the formation of the internal electrodes on each of the dielectric sheets by screen printing is terminated. Further, preferably, the separation of the absorptive member from the internal electrodes may be performed at a velocity of 40 to 60 cm/sec.

Preferably, portions of the internal electrodes absorbed onto the roller may be scrapped by a scrapper, and eliminated by suction force supplied from a front end of the scrapper.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In a method for manufacturing a multilayer ceramic capacitor in accordance with the present invention, internal electrodes having a small thickness are formed on each of a plurality of dielectric sheets. Hereinafter, the method for manufacturing the multilayer ceramic capacitor of the present invention will be described in detail.

First, a dielectric sheet 10 is prepared. In order to produce the dielectric sheet 10, a dielectric powder, an organic bonder, and a solvent are mixed, thereby forming a dielectric slurry and then molding the dielectric slurry into the dielectric sheet 10. Thereafter, internal electrodes 20 having a designated thickness are formed on the dielectric sheet 10.

Figure 2A:
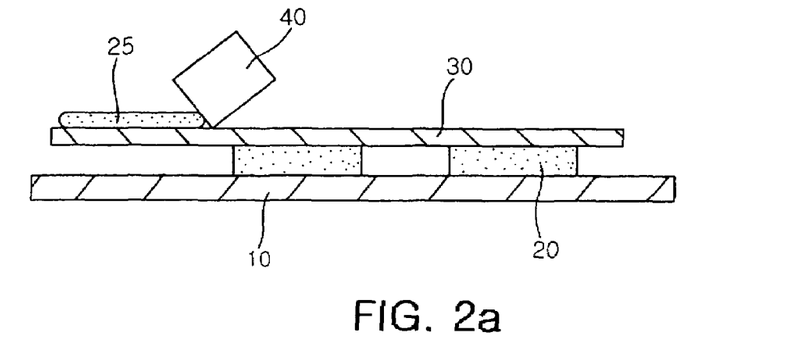
FIGS. 2A to 2C are sectional views respectively illustrating steps of a method for manufacturing a multilayer ceramic capacitor in accordance with the present invention.

A step of printing the internal electrodes 20 on the dielectric sheet 10 is achieved by conventional screen printing. That is, as shown in FIG. 2A, a screen 30 is disposed on the upper surface of the dielectric sheet 10, and an electrode paste 25 is placed on the upper surface of the screen 30 and squeezed by a squeezer 40, thereby forming the internal electrodes 20 on the dielectric sheet 10. Here, the electrode paste 25 may be a Cu or Ni paste.

After the internal electrodes 20 are formed on the dielectric sheet 10 as described above, in order to decrease the thickness of the internal electrodes 20, an absorptive member 50 is placed on the surface of the dielectric sheet 10, on which the internal electrodes 20 are printed. Thereafter, the absorptive member 50 contacts the surface of the dielectric sheet 10, on which the internal electrodes 20 are printed, so that portions 21 of the internal electrodes 20 are absorbed onto the absorptive member 50.

Figure 2B:
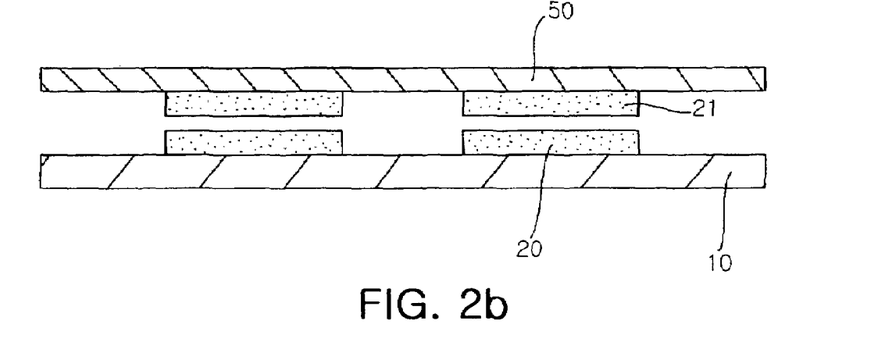

When the absorptive member 50 is separated from the dielectric sheet 10, as shown in FIG. 2B, the portions 21 of the internal electrodes 20 absorbed onto the absorptive member 50 are also separated from the dielectric sheet 10, and the remainder of the internal electrodes 20 remains on the dielectric sheet 10.

Here, the electrode paste 25 for forming the internal electrodes 20, which are formed on the dielectric sheet 10 by screen printing, is dried just after the printing of the internal electrodes 20, and the absorptive power of the electrode paste 25 is deteriorated as the drying of the electrode paste 25 progresses. Accordingly, preferably, the absorption of the portions 21 of the internal electrodes 20 onto the absorptive member 50 is performed just after the termination of the screen printing of the internal electrodes 20.

Further, preferably, the separation of the absorptive member 50, onto which the portions 21 of the internal electrodes 20 are absorbed, from the dielectric sheet 10 is performed just after the termination of the absorption of the portions 21 of the internal electrodes 20 onto the absorptive member 50 in consideration of thixotropy of the electrode paste 25 having a viscosity of 5,000 to 20,000 cps.

Preferably, the reduction of the thickness of the internal electrodes 20 by separating the absorptive member 50, onto which the portions 21 of the internal electrodes 20 are absorbed, from the dielectric sheet 10 is performed prior to the completely drying of the internal electrodes 20 by supplying a heat source to the internal electrodes 20 printed on the dielectric sheet 50.

In terms of process time, the absorption of the portions 21 of the internal electrodes 20 onto the absorptive member 50 is completed within one second from the screen printing of the internal electrodes 20, and the separation of the absorptive member 50 from the dielectric sheet 10 is performed at a velocity of 40 to 60 cm/sec.

In case that the separation velocity of the absorptive member 50 is slower than 40 cm/sec, the surface state of the internal electrodes 20 remaining on the dielectric sheet 10 is poor, and in case that the separation velocity of the absorptive member 50 is faster than 60 cm/sec, the thickness of the internal electrodes 20 remaining on the dielectric sheet 10 is excessively small, i.e., less than 50%, thereby deteriorating electric characteristics of the internal electrodes 20.

The absorption of the portions 21 of the internal electrodes 20 onto the absorptive member 50 is achieved in consideration of an absorptive pressure between the internal electrodes 20 and the absorptive member 50. Preferably, the absorptive pressure, which is supplied from the outside in order to absorb the portions 21 of the internal electrodes 20 onto the absorptive member 50, is in the range from the minimum pressure due to the weight of the absorptive member 50 to a maximum pressure of 500 g/cm$^2$. As the absorptive pressure is increased up to 500 g/cm$^2$, the absorptivity of the portions 21 of the internal electrodes 20 onto the absorptive member 50 is increased in direct proportion to the increase of the absorptive pressure, and when the absorptive pressure exceeds 500 g/cm$^2$, the absorptivity of the portions 21 of the internal electrodes 20 onto the absorptive member 50 is not increased any more.

Paper may be used as the absorptive member 50. The paper exhibits good absorptivity of liquid, and contacts the internal electrodes 20 in a gel state before drying so that the portions 21 of the internal electrodes 20 are adhered to the paper.

Further, a dielectric sheet may be used as the absorptive member 50. The dielectric sheet made of the same material as that of the dielectric sheet 10, on which the internal electrodes 20 are printed, is used as the absorptive member 50, thereby causing the internal electrodes 20 to be absorbed onto the upper and lower dielectric sheets by the same absorptivity. When the upper dielectric sheet is separated from the lower dielectric sheet 10 after the portions 21 of the internal electrodes 20 are absorbed onto the lower dielectric sheet used as the absorptive member 50, the thickness of the internal electrodes 20 is reduced by approximately 50%.

The absorptive member 50 is not limited to the paper or the dielectric sheet, but may be made of a polymeric substance or a polymeric thin film coated with a polymeric substance so as to absorb the internal electrodes 20.

The polymeric substance selectively uses cellulose, polyethylene, or polyvinyl butylene, which the electrode paste 25 mainly contains.

Figure 3:
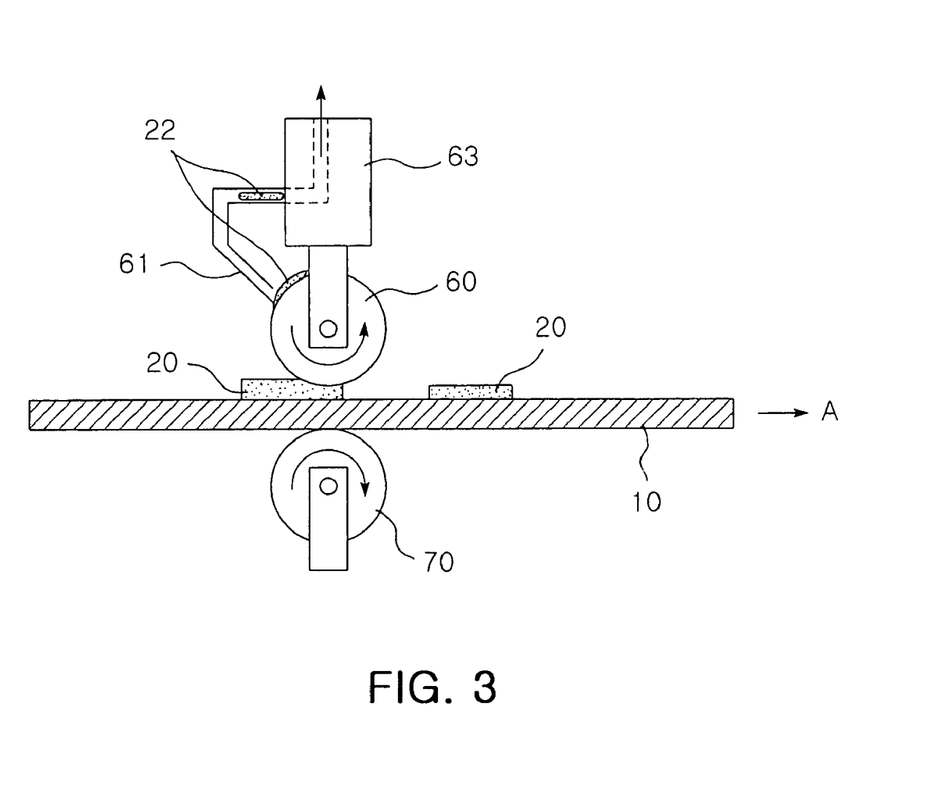
FIG. 3 is a sectional view illustrating another absorbing step of the method for manufacturing the multilayer ceramic capacitor in accordance with the present invention.

In addition to a platy member, such as the paper or the dielectric sheet, a roller may be used as the absorptive member 50. FIG. 3 illustrates a roller 60 used as the absorptive member. The roller 60, differing from the paper or the dielectric sheet, applies pressure to the internal electrodes 20 and absorbs the internal electrodes 20 simultaneously.

That is, in case that the roller 60 is used as the absorptive member, preferably, the roller 60 is made of a metal having a low surface roughness rather than a rubber in order to obtain excellent absorptive characteristics.

In case that the roller 60 is made of metal, more preferably, the outer surface of the metallic roller 60, which contacts the internal electrodes 20, is coated with a coating layer made of a polymeric substance, rather than being made of the same metal as that of the main body of the metallic roller 60, in order to improve absorptive characteristics. Here, the polymeric substance of the coating layer is selected from the group consisting of cellulose, polyethylene, and polyvinyl butylene.

In order to prevent the internal electrodes 20 from having a large thickness due to the adhesion of a portion 22 of an internal electrode 20, which is absorbed onto the surface of roller 60, to another neighboring internal electrode 20, at least one scraper 61 for eliminating the portion 22 of the internal electrode 20 absorbed onto the surface of the roller 60 is installed on the roller 60. Preferably, the scraper 61 is made of a hard rubber material so as to minimize damage of the surface of the roller 60 and easily eliminate the absorbed portion 22 of the internal electrode 20.

Preferably, the roller 60 is provided with collecting means for supplying suction force to the front end of the scraper 61 so as to remove the portions 22 of the internal electrodes, removed from the surface of the roller 60 by the scraper 61, by means of suction using vacuum.

A corresponding roller 70, which contacts the lower surface of the dielectric sheet 10, is located under the dielectric sheet 10, which travels in the direction of arrow A, such that the corresponding roller 70 withstands local pressure applied downwardly from the roller 60. That is, the roller 60 and the corresponding roller 70, which are respectively located on and under the dielectric sheet 10, are prepared in a pair.

Figure 2C:
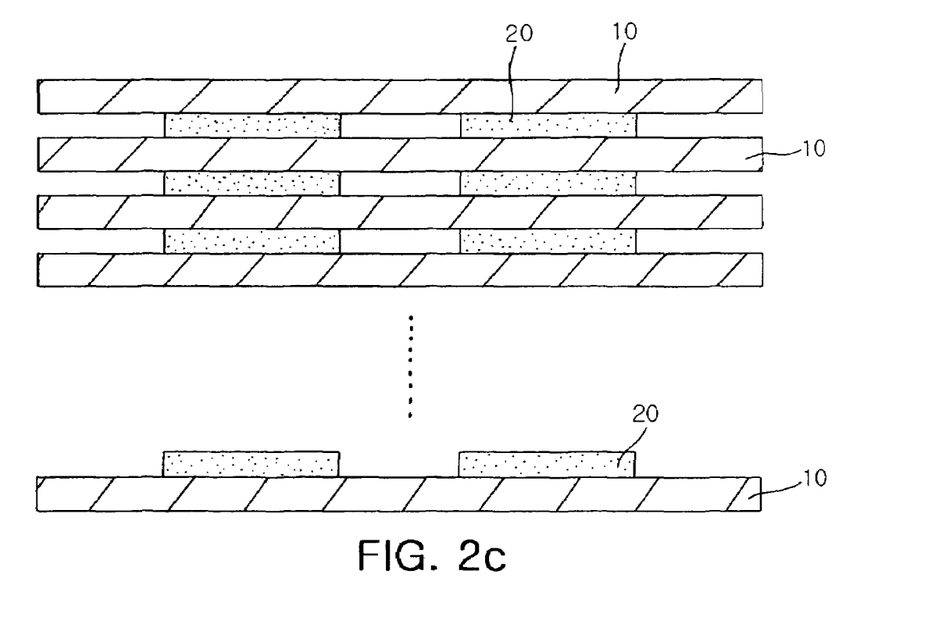

After the reduction of the thickness of the internal electrodes 20 formed on the dielectric sheet 10, as shown in FIG. 2C, a plurality of the dielectric sheets 10 provided with the internal electrodes 20 printed thereon are stacked under pressure. Here, the thicknesses of the internal electrodes 20 formed on the dielectric sheets 10 are sufficiently decreased such that a difference of heights between the internal electrodes 20 and the dielectric sheets 10 is reduced, thereby reducing the failures, such as short circuits of the internal electrodes 20, due to the high difference of the heights between the internal electrodes 20 and the dielectric sheets 10 during the stacking of the dielectric sheets 10.

Since the internal electrodes 20 of the present invention have a reduced thicknesses compared to the conventional internal electrodes, a large number of the dielectric sheets 10 can be stacked in the same volume, thereby enabling manufacture of a multilayer ceramic capacitor having a high capacity.

The dielectric sheets 10 stacked under pressure are cut and separated into unit multilayer ceramic capacitor chips.

Multilayer ceramic capacitors are completed by plastic-forming and baking the chips.

First Embodiment

Internal electrodes having a thickness of 1.2 μm are formed on a dielectric sheet for an MLCC, which is produced using polyvinyl butylene as a binder, by screen printing. Then, a polyethylene film used as an absorptive member contacts the internal electrodes, and an absorptive pressure of 500 g/cm$^2$ is applied to the contact portions between the polyethylene film and the internal electrodes so that the internal electrodes are partially absorbed onto the absorptive member.

Thereafter, the absorptive member is separated from the dielectric sheet such that the portions of the internal electrodes absorbed onto the absorptive member are separated from the internal electrodes remaining on the dielectric sheet. Thereby, the thickness of the internal electrodes remaining on the dielectric sheet is reduced to 0.6 μm.

Second Embodiment

Internal electrodes having a thickness of 1.2 μm are formed on a dielectric sheet for an MLCC, which is produced using polyvinyl butylene as a binder, by screen printing. Then, an ethyl cellulose film used as an absorptive member contacts the internal electrodes, and an absorptive pressure of 500 g/cm$^2$ is applied to the contact portions between the ethyl cellulose film and the internal electrodes so that the internal electrodes are partially absorbed onto the absorptive member.

Thereafter, the absorptive member is separated from the dielectric sheet such that the portions of the internal electrodes absorbed onto the absorptive member are separated from the internal electrodes remaining on the dielectric sheet. Thereby, the thickness of the internal electrodes remaining on the dielectric sheet is reduced to 0.7 μm.

Third Embodiment

Internal electrodes having a thickness of 1.2 μm are formed on a dielectric sheet for an MLCC, which is produced using polyvinyl butylene as a binder, by screen printing. Then, a polyethylene film used as an absorptive member contacts the internal electrodes, and an absorptive pressure of 300 g/cm$^2$ is applied to the contact portions between the ethyl cellulose film and the internal electrodes so that the internal electrodes are partially absorbed onto the absorptive member.

Thereafter, the absorptive member is separated from the dielectric sheet such that the portions of the internal electrodes absorbed onto the absorptive member are separated from the internal electrodes remaining on the dielectric sheet. Thereby, the thickness of the internal electrodes remaining on the dielectric sheet is reduced to 0.8 μm.

Fourth Embodiment

Internal electrodes having a thickness of 1.2 μm are formed on a dielectric sheet for an MLCC, which is produced using polyvinyl butylene as a binder, by screen printing. Then, the internal electrodes are partially absorbed onto a roller, the outer surface of which is coated with a polyethylene film, and the portions of the internal electrodes absorbed onto the roller are scraped and removed by a scrapper.

Thereby, the thickness of the internal electrodes remaining on the dielectric sheet is reduced to 0.7 μm.

Figure 4:
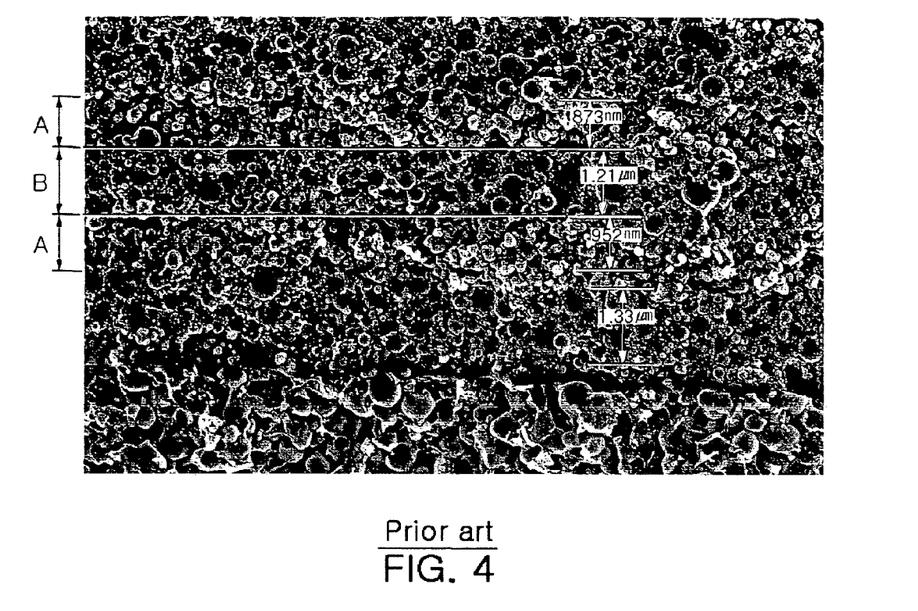
FIG. 4 is a photograph illustrating a section of a conventional multilayer ceramic capacitor.
Figure 5:
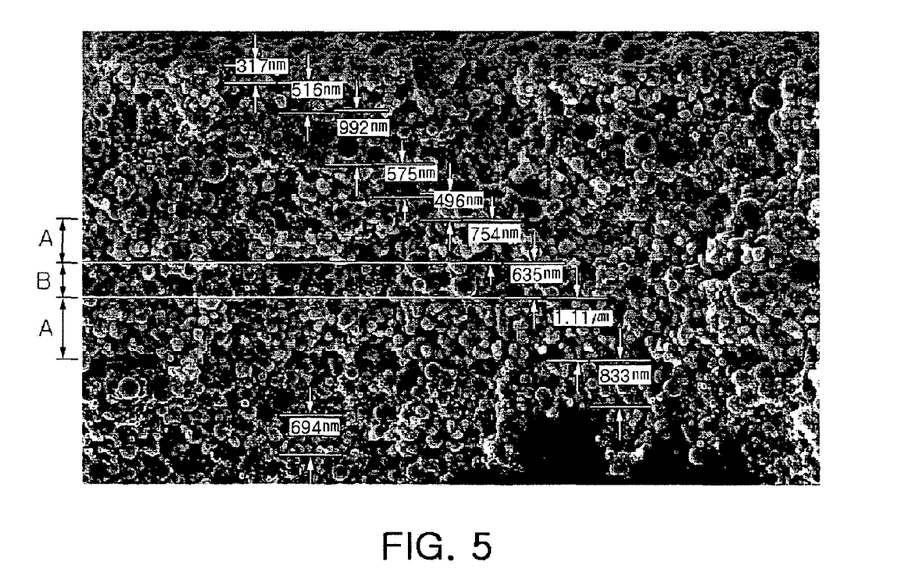
FIG. 5 is a photograph illustrating a section of a multilayer ceramic capacitor manufactured by the method of the present invention.

FIG. 4 is a photograph illustrating a section of a conventional multilayer ceramic capacitor, in which internal electrodes are formed on dielectric sheets, and FIG. 5 is a photograph illustrating a section of a multilayer ceramic capacitor manufactured by the method of the present invention, in which the thicknesses of internal electrodes on dielectric sheets are reduced.

In FIG. 4, dielectric layers (A) respectively have thicknesses of 873 nm and 952 nm, and an internal electrode layer (B) formed between the dielectric layers (A) has a thickness of 1,210 nm. FIG. 4 is a photograph of a section of the conventional multilayer ceramic capacitor manufactured by forming the internal electrode layer (A) on the dielectric layer (A) by general screen printing, and stacking a plurality of the dielectric layers (A), each of which is provided with the internal electrode layer (B) formed thereon, under pressure, illustrating that the thickness of the internal electrode layer (B) is larger than those of the dielectric layers (A).

On the other hand, FIG. 5 is a photograph of a section of the multilayer ceramic capacitor of the present invention. Here, dielectric layers (A) respectively have thicknesses of 754 nm and 1,110 nm, and an internal electrode layer (B') having a reduced thickness by an absorbing step of the method of the present invention is formed between the dielectric layers (A). The internal electrode layer (B') has a thickness of 635 nm. That is, the thickness of the internal electrode layer (B') of the multilayer ceramic capacitor of the present invention is smaller than those of the dielectric layers (A), and is approximately half that of the internal electrode layer (B) of the conventional multilayer ceramic capacitor.

Accordingly, the multilayer ceramic capacitor of the present invention has internal electrodes having reduced thicknesses, thereby having a high capacity.

As apparent from the above description, the present invention provides a method for manufacturing a multilayer ceramic capacitor (MLCC), in which internal electrodes printed on each of dielectric sheets are absorbed onto an absorptive member so that the internal electrodes on the dielectric sheets have reduced thicknesses, thereby increasing the number of the dielectric sheets to be stacked in the same volume, and achieving a high capacity.

Further, the method for manufacturing the MLCC of the present invention by stacking a plurality of the dielectric sheets, each of which is provided with thin internal electrodes formed thereon, prevents electrical short circuits generated from the stacking of the dielectric sheets due to a difference of heights between the dielectric sheets and the internal electrodes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a multilayer ceramic capacitor, said method comprising:
   printing internal electrodes having a first thickness on a surface of each of a plurality of dielectric sheets,
   causing an absorptive member to contact the surface of each of the dielectric sheets printed with the internal electrodes and then separating the absorptive member from the surface so that portions of the internal electrodes are eliminated and, hence, the internal electrodes have a second thickness smaller than the first thickness, and stacking the dielectric sheets provided with the internal electrodes having the second thickness to form a chip element.

2. The method as set forth in claim 1, wherein the second thickness of the internal electrodes is smaller than a thickness of each of the dielectric sheets.

3. The method as set forth in claim 1, wherein the internal electrodes are made of Cu or Ni.

4. The method as set forth in claim 1, wherein the internal electrodes are formed on each of the dielectric sheets by screen printing.

5. The method as set forth in claim 1, wherein the absorptive member is paper.

6. The method as set forth in claim 1, wherein the absorptive member is another dielectric sheet.

7. The method as set forth in claim 6, wherein the another dielectric sheet forming the absorptive member is made of same material as the dielectric sheets printed with the internal electrodes.

8. The method as set forth in claim 1, wherein the absorptive member is a thin film, a surface of which is printed with a polymeric substance capable of absorbing the internal electrodes.

9. The method as set forth in claim 8, wherein the polymeric substance is one selected from the group consisting of cellulose, polyethylene, and polyvinyl butylene.

10. The method as set forth in claim 1, wherein the absorptive member is a thin film containing a polymeric substance capable of absorbing the internal electrodes.

11. The method as set forth in claim 10, wherein the polymeric substance is one selected from the group consisting of cellulose, polyethylene, and polyvinyl butylene.

12. The method as set forth in claim 1, wherein the absorptive member is a roller applying a pressure to the internal electrodes and contacting the internal electrodes.

13. The method as set forth in claim 12, wherein a surface of the roller is coated with a polymeric substance capable of absorbing the internal electrodes.

14. The method as set forth in claim 13, wherein the polymeric substance is one selected from the group consisting of cellulose, polyethylene, and polyvinyl butylene.

15. The method as set forth in claim 12, wherein each of the dielectric sheets is passed between a roller pair which includes (i) said roller contacting the internal electrodes and (ii) another roller contacting an opposite surface of the dielectric sheet.

16. The method as set forth in claim 1, wherein the first thickness of the internal electrodes is reduced to the second thickness, by absorption of the internal electrodes onto the absorptive member and subsequent separation of the absorptive member from the internal electrodes, prior to completely drying the internal electrodes by heating the internal electrodes printed on each of the dielectric sheets.

17. The method as set forth in claim 16, wherein the absorption of the internal electrodes onto the absorptive member is performed just after the formation of the internal electrodes on each of the dielectric sheets by screen printing is terminated.

18. The method as set forth in claim 16, wherein the separation of the absorptive member from the internal electrodes is performed at a velocity of 40 to 60 cm/sec.

19. The method as set forth in claim 12, wherein portions of the internal electrodes absorbed onto the roller are scrapped by a scrapper, and are eliminated by a suction force supplied from a front end of the scrapper.

20. A method of manufacturing a multilayer ceramic capacitor, said method comprising:

preparing a plurality of dielectric sheets;

printing internal electrodes having a first thickness on a surface of each of the dielectric sheets using a screen having a number of meshes;

causing an absorptive member to contact the surface of each of the dielectric sheets printed with the internal electrodes and then separating the absorptive member from the surface so that portions of the internal electrodes are eliminated and, hence, the internal electrodes have a second thickness smaller than the first thickness;

stacking the dielectric sheets, having the internal electrodes of the second thickness, under pressure;

cutting the stacked dielectric sheets into unit chips; and plastic-forming and baking the chips.

21. The method as set forth in claim 20, wherein the second thickness of the internal electrodes is smaller than a thickness of each of the dielectric sheets.

22. The method as set forth in claim 20, wherein the internal electrodes are made of Cu or Ni.

23. The method as set forth in claim 20, wherein the internal electrodes are formed on each of the dielectric sheets by screen printing.

24. The method as set forth in claim 20, wherein the absorptive member is paper.

25. The method as set forth in claim 20, wherein the absorptive member is another dielectric sheet.

26. The method as set forth in claim 25, wherein the another dielectric sheet forming the absorptive member is made of same material as the dielectric sheets printed with the internal electrodes.

27. The method as set forth in claim 20, wherein the absorptive member is a thin film, a surface of which is printed with a polymeric substance capable of absorbing the internal electrodes.

28. The method as set forth in claim 27, wherein the polymeric substance is one selected from the group consisting of cellulose, polyethylene, and polyvinyl butylene.

29. The method as set forth in claim 20, wherein the absorptive member is a thin film containing a polymeric substance capable of absorbing the internal electrodes.

30. The method as set forth in claim 29, wherein the polymeric substance is one selected from the group consisting of cellulose, polyethylene, and polyvinyl butylene.

31. The method as set forth in claim 20, wherein the absorptive member is a roller applying a pressure to the internal electrodes and contacting the internal electrodes.

32. The method as set forth in claim 31, wherein a surface of the roller is coated with a polymeric substance capable of absorbing the internal electrodes.

33. The method as set forth in claim 32, wherein the polymeric substance is one selected from the group consisting of cellulose, polyethylene, and polyvinyl butylene.

34. The method as set forth in claim 31, wherein each of the dielectric sheets is passed between a roller pair which includes (i) said roller contacting the internal electrodes and (ii) another roller contacting an opposite surface of the dielectric sheet.

35. The method as set forth in claim 20, wherein the first thickness of the internal electrodes is reduced to the second thickness by:

absorption of the internal electrodes onto the absorptive member by causing the absorptive member to contact the internal electrodes of each of the dielectric sheets; and elimination of absorbed portions of the internal electrodes, while allowing a remainder of the internal electrodes to remain on each of the dielectric sheets, by separation of the absorptive member from the internal electrodes.

36. The method as set forth in claim 20, wherein the first thickness of the internal electrodes is reduced to the second thickness prior to drying the internal electrodes by heating the internal electrodes printed on each of the dielectric sheets.

37. The method as set forth in claim 35, wherein the absorption of the internal electrodes onto the absorptive member is performed just after the formation of the internal electrodes on each of the dielectric sheets by screen printing is terminated.

38. The method as set forth in claim 35, wherein the separation of the absorptive member from the internal electrodes is performed at a velocity of 40 to 60 cm/sec.

39. The method as set forth in claim 31, wherein portions of the internal electrodes absorbed onto the roller are scrapped by a scrapper, and are eliminated by a suction force supplied from a front end of the scrapper.

40. A method of manufacturing a multilayer ceramic capacitor, said method comprising:

printing internal electrodes on each of a plurality of dielectric sheets;

after said printing, removing a thickness of the internal electrodes printed on each of the dielectric sheets by (i) causing an absorptive member to contact the internal electrodes and to absorb the internal electrodes printed on each of the dielectric sheets and then (ii) separating the absorptive member from the internal electrodes; and after said removing, stacking the dielectric sheets provided with the internal electrodes to form a chip element.

* * * * *